(12) United States Patent
Lopez et al.

(10) Patent No.: US 8,759,438 B2
(45) Date of Patent: Jun. 24, 2014

(54) TIRE, THE TREAD OF WHICH COMPRISES A SATURATED THERMOPLASTIC ELASTOMER

(75) Inventors: Béatrice Lopez, Chavaroux (FR); Didier Vasseur, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 244 days.

(21) Appl. No.: 13/377,856

(22) PCT Filed: Jun. 28, 2010

(86) PCT No.: PCT/EP2010/059124
§ 371 (c)(1),
(2), (4) Date: May 11, 2012

(87) PCT Pub. No.: WO2011/000797
PCT Pub. Date: Jan. 6, 2011

(65) Prior Publication Data
US 2012/0214933 A1    Aug. 23, 2012

(30) Foreign Application Priority Data

Jun. 29, 2009 (FR) ..................................... 09 54405

(51) Int. Cl.
*C08J 3/22* (2006.01)
*C09B 67/00* (2006.01)

(52) U.S. Cl.
USPC .......................................... 524/525; 524/502

(58) Field of Classification Search
USPC ....................................................... 524/525
See application file for complete search history.

(56) References Cited

U.S. PATENT DOCUMENTS

| | | | |
|---|---|---|---|
| 5,959,062 | A | 9/1999 | Ohtsuka et al. |
| 5,977,238 | A | 11/1999 | Labauze |
| 6,013,718 | A | 1/2000 | Cabioch et al. |
| 6,503,973 | B2 | 1/2003 | Robert et al. |
| 6,774,255 | B1 | 8/2004 | Tardivat et al. |
| 6,815,473 | B2 | 11/2004 | Robert et al. |
| 2003/0212185 | A1 | 11/2003 | Vasseur |
| 2004/0051210 | A1 | 3/2004 | Tardivat et al. |
| 2004/0132880 | A1 | 7/2004 | Durel et al. |
| 2004/0167705 | A1 | 8/2004 | Lingman et al. |
| 2005/0016650 | A1 | 1/2005 | Durel et al. |
| 2005/0016651 | A1 | 1/2005 | Durel et al. |
| 2006/0089445 | A1 | 4/2006 | Gandon-Pain |
| 2007/0112120 | A1 | 5/2007 | Vasseur |
| 2008/0009564 | A1 | 1/2008 | Robert et al. |
| 2008/0045643 | A1 | 2/2008 | Henning et al. |
| 2008/0132644 | A1 | 6/2008 | Lapra et al. |
| 2008/0188621 | A1* | 8/2008 | Ichino et al. .................. 525/232 |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2009/0270558 | A1 | 10/2009 | Gandon-pain et al. |
| 2010/0022714 | A1 | 1/2010 | Varagniat et al. |
| 2010/0204359 | A1 | 8/2010 | Robert et al. |
| 2011/0021702 | A1 | 1/2011 | Gandon-Pain et al. |
| 2011/0152458 | A1 | 6/2011 | Araujo Da Silva et al. |

FOREIGN PATENT DOCUMENTS

| | | |
|---|---|---|
| EP | 0902054 A1 | 3/1999 |
| FR | 2877348 A1 | 5/2006 |
| WO | WO 97/36724 A2 | 10/1997 |
| WO | WO 99/16600 A1 | 4/1999 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |
| WO | WO 03/002648 A1 | 1/2003 |
| WO | WO 03/002649 A1 | 1/2003 |
| WO | WO 03/016837 A1 | 2/2003 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2008/003434 A1 | 1/2008 |
| WO | WO 2008/003435 A1 | 1/2008 |

OTHER PUBLICATIONS

International Search Report (PCT/ISA/210) issued on Jul. 30, 3010, by Netherlands Patent Office as the International Searching Authority for International Application No. PCT/EP2010/059124.

\* cited by examiner

*Primary Examiner* — Hui Chin
(74) *Attorney, Agent, or Firm* — Dickinson Wright PLLC

(57) ABSTRACT

The present invention relates to a tire, the tread of which comprises an elastomer composition comprising: from 10 to 60 phr of a polybutadiene (BR) elastomer; from 10 to 60 phr of a saturated thermoplastic styrene (TPS) elastomer; a reinforcing filler.

The combined use of BR and saturated TPS elastomers makes it possible to increase the stiffness and thus to improve the handling performance of the tires, without adversely affecting the hysteresis and therefore the rolling resistance of these tires.

18 Claims, No Drawings

TIRE, THE TREAD OF WHICH COMPRISES A SATURATED THERMOPLASTIC ELASTOMER

The present invention relates to tyre treads and to rubber compositions based on diene elastomers and on saturated thermoplastic styrene elastomers, used for the manufacture of such tyre treads.

As is known, a tyre has to meet a large number of often conflicting technical requirements, including a high wear resistance, a low rolling resistance, a high grip on both the dry road and the wet road and good handling performance on a motor vehicle.

This compromise in properties, in particular from the viewpoint of the rolling resistance and the wear resistance, was able to be improved in recent years with regard to energy-saving "Green Tyres", intended in particular for passenger vehicles, by virtue in particular of the use of novel low hysteresis rubber compositions having the feature of being reinforced predominantly by specific inorganic fillers, described as reinforcing fillers, in particular by highly dispersible silicas (HDSs), capable of rivalling, from the viewpoint of the reinforcing power, conventional tyre-grade carbon blacks.

To improve the handling performance, it is known that a high stiffness of the tread is desirable, it being possible for this stiffening of the tread to be obtained for example by increasing the reinforcing filler content or by incorporating certain reinforcing resins into the constituent rubber compositions of these treads (see, for example, document WO 02/10269).

As is known, however, such a stiffening of the tread may adversely affect the hysteresis and therefore the rolling resistance of the tyres.

By continuing their research, the Applicants have discovered a tyre tread comprising a specific rubber composition, based on a polybutadiene and on a saturated TPS copolymer, which makes it possible to improve the stiffness and therefore the handling performance of the tyres, without adversely affecting the hysteresis.

Thus, a first subject of the invention relates to a tyre having a tread that comprises an elastomer composition, said composition comprising:
  from 10 to 60 phr of a polybutadiene (BR) elastomer;
  from 10 to 60 phr of a saturated thermoplastic styrene (TPS) elastomer; and
  a reinforcing filler.

The tyres of the invention are particularly intended to be fitted onto motor vehicles of the passenger type, SUVs (Sport Utility Vehicles), two-wheel vehicles (especially motorcycles), aircraft, or industrial vehicles chosen from vans, "heavy" vehicles, i.e. underground trains, buses, heavy road transport vehicles (lorries, tractors, trailers), off-road vehicles, such as agricultural or civil engineering machines, and other transport or handling vehicles.

The invention and its advantages will be readily understood in light of the description and the exemplary embodiments that follow.

I—Measurements and Tests Used

The rubber compositions used in the tyres according to the invention are characterized, before and after curing, as indicated below.

I.1—Tensile Tests

These tests make it possible to determine the elasticity stresses and the properties at break. Unless otherwise indicated, they are carried out in accordance with the French standard NF T 46-002 of September 1988. At second elongation (i.e. after an accommodation cycle at the extension rate provided for the measurement itself) the nominal secant moduli (or apparent stresses, in MPa) are measured at 10% elongation (denoted by MA10) and at 100% elongation (denoted by MA100). All these tensile measurements are carried out under standard temperature (23±2° C.) and moisture (50±5% relative humidity) conditions, according to the French standard NF T 40-101 (December 1979).

I.2—Shore A Hardness

The Shore A hardness of the compositions after curing is assessed in accordance with the standard ASTM D 2240-86.

I.3—Dynamic Properties

The dynamic properties are measured on a viscosity analyser (Metravib VA4000) according to the standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded during a temperature sweep at a fixed stress of 0.7 MPa. The value of tan($\delta$) observed at 40° C. (i.e. tan($\delta$)$_{40° C.}$) is recorded.

It is recalled, in a manner well known to a person skilled in the art, that the value of tan($\delta$)$_{40° C.}$ is representative of the hysteresis of the material, and therefore of the rolling resistance: the lower tan($\delta$)$_{40° C.}$, the lower the rolling resistance.

II—Conditions for Implementing the Invention

The tyre according to the invention that has a tread comprising an elastomer composition comprising at least:
  from 10 to 60 phr of a polybutadiene (BR) elastomer;
  from 10 to 60 phr of a saturated thermoplastic styrene (TPS) elastomer; and
  a reinforcing filler.

The term "phr" stands for parts by weight per hundred parts of total elastomer, including therefore the saturated TPS elastomer.

In the present description, unless expressly indicated otherwise, all the percentages (%) shown are % by weight. Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

II.1—Diene Elastomer

It is recalled here that the term "diene" elastomer (or rubber, the two being considered to be synonymous) should be understood to mean, in a known manner, an elastomer resulting at least in part (i.e., a homopolymer or a copolymer) from diene monomers (monomers bearing two carbon-carbon double bonds which may or may not be conjugated).

The tyre tread according to the invention comprises a rubber composition that has a first essential feature of comprising a polybutadiene (BR) in an amount from 10 to 60 phr. Below the indicated minimum, the wear resistance runs the risk of being substantially reduced, whereas above the recommended maximum the grip on wet ground performance is degraded. For these reasons, the polybutadiene content is preferably in a range from 20 to 55 phr.

Suitable butadiene monomers are in particular 1,3-butadiene, 2-methyl-1,3-butadiene, 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene or 2-methyl-3-isopropyl-1,3-butadiene and aryl-1,3-butadiene.

Especially suitable are BRs having a content (mol %) of 1,2-units of between 4% and 80% or those having a content (mol %) of cis-1,4-units of greater than 80%, more preferably greater than 90%.

According to one preferred embodiment, the BR elastomer is the only diene elastomer present in the composition.

According to another preferred embodiment, the rubber composition of the tyre tread according to the invention may comprise a second diene elastomer, the content of which is preferably between 0 and 80 phr, more preferably in a range from 5 to 60 phr.

The second diene elastomer is chosen from the group formed by styrene-butadiene copolymers (SBRs), natural rubber (NR), synthetic polyisoprenes (IRs), isoprene-styrene copolymers (SIRs), isoprene-butadiene copolymers (BIRs), styrene-butadiene-isoprene terpolymers (SBIRs) and blends of these elastomers.

Preferably, the second diene elastomer is an SBR elastomer. The SBR copolymers may, for example, be block, random, sequential or microsequential copolymers and may be prepared in dispersion or in solution; they may be coupled and/or star-branched or else functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or else of polyether groups (such as described, for example, in U.S. Pat. No. 6,503,973).

The SBR elastomer may be an SBR prepared in emulsion ("ESBR") or an SBR prepared in solution ("SSBR"). In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4- bonds of between 15% and 75% and a $T_g$ of between −10° C. and −55° C.

II.2—Saturated Thermoplastic Styrene Elastomer

The tyre according to the invention comprises a rubber composition that has another essential feature of comprising a saturated TPS elastomer in an amount from 10 to 60 phr, preferably from 15 to 55 phr. Below 10 phr the stiffness of the composition is not sufficiently improved, above 60 phr the hysteresis risks being adversely affected.

Thermoplastic styrene (TPS) elastomers are thermoplastic elastomers which are in the form of styrene-based block copolymers.

Having a structure intermediate between thermoplastic polymers and elastomers, they are composed, in a known manner, of hard polystyrene blocks linked by soft elastomer blocks, for example polybutadiene, polyisoprene or poly(ethylene/butylene) blocks. They are often triblock elastomers with two hard segments linked by a soft segment. The hard and soft segments may be in a linear, star or branched configuration. These TPS elastomers may also be diblock elastomers with one single hard segment linked to a soft segment. Typically, each of these segments or blocks contains at least more than 5, generally more than 10 base units (for example styrene units and isoprene units for a styrene/isoprene/styrene block copolymer).

In the present application, it is understood, by definition and as is known, that:

the expression "saturated TPS elastomer" means a TPS elastomer that does not comprise any ethylenically unsaturated groups (i.e. no carbon-carbon double bond); and the expression "unsaturated TPS elastomer" means a TPS elastomer that is provided with ethylenically unsaturated groups, that is to say which comprises (conjugated or unconjugated) carbon-carbon double bonds.

According to one preferred embodiment, the saturated TPS copolymer is a copolymer comprising styrene blocks and alkylene blocks. The alkylene blocks are preferably ethylene, propylene or butylene blocks.

Preferably, the saturated TPS elastomer is chosen from the group formed by styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS), styrene/ethylene/ethylene/propylene/styrene (SEEPS) block copolymers and blends of these copolymers.

More preferably, said elastomer is chosen from the group formed by SEBS copolymers, SEPS copolymers, SEEPS copolymers and blends of these copolymers.

According to another preferred embodiment of the invention, the styrene content of the saturated TPS elastomer is between 5% and 50%. Below the minimum indicated, the thermoplastic nature of the elastomer runs the risk of being substantially reduced, whereas above the recommended maximum the elasticity of the composition may be adversely affected. For these reasons, the styrene content is more preferably between 10% and 40%, in particular between 15% and 35%.

The number-average molecular weight (denoted by MO of the saturated TPS elastomer is preferably between 50 000 and 500 000 g/mol, more preferably between 75 000 and 450 000 g/mol, especially for use of the composition in a tyre tread.

The molecular weight $M_n$ is determined in a known manner by size exclusion chromatography (SEC). The specimen is first dissolved in tetrahydrofuran to a concentration of about 1 g/l; then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series having the trade names STYRAGEL (HMW7, HMW6E and two HT6E) is used. The injected volume of the polymer specimen solution is 100 μl. The detector is a WATERS 2410 differential refractometer and its associated software for handling the chromatographic data is the WATERS MILLENNIUM system. The calculated average molecular weights are relative to a calibration curve obtained with polystyrene standards.

Mention may be made, as examples of commercially available saturated TPS elastomers, of elastomers of SEPS, SEEPS or SEBS type sold by the company Kraton under the name Kraton G (e.g., products G1650, G1651, G1654, G1730) or the company Kuraray under the name Septon (e.g., Septon 2007, Septon 4033, Septon 8004).

II.3—Reinforcing Filler

Use may be made of any type of reinforcing filler known for its capabilities of reinforcing a rubber composition which can be used for the manufacture of tyres, for example an organic filler, such as carbon black, a reinforcing inorganic filler, such as silica, or else a blend of these two types of filler, in particular a blend of carbon black and silica.

All carbon blacks, in particular blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example, N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers as described in Applications WO-A-2006/069792, WO-A-2006/069793, WO-A-2008/003434 and WO-A-2008/003435.

The expression "reinforcing inorganic filler" should be understood, in the present patent application, by definition, to mean any inorganic or mineral filler (whatever its colour and its natural or synthetic origin), also known as "white filler", "clear filler" or even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the expression "reinforcing inorganic filler" is also understood to mean mixtures of various reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 m$^2$/g, preferably from 30 to 400 m$^2$/g. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in Application WO 03/16837.

The reinforcing inorganic filler used, in particular if it is silica, preferably has a BET surface area of between 45 and 400 m$^2$/g, more preferably of between 60 and 300 m$^2$/g.

Preferably, the content of total reinforcing filler (carbon black and/or reinforcing inorganic filler, such as silica) is between 20 and 200 phr, more preferably between 30 and 150 phr, the optimum being, in a known manner, different depending on the particular applications targeted: the level of reinforcement expected with regard to a bicycle tyre, for example, is, of course, less than that required with regard to a tyre capable of running at high speed in a sustained manner, for example a motorcycle tyre, a tyre for a passenger vehicle or a tyre for a utility vehicle, such as a heavy vehicle.

According to a preferred embodiment of the invention, use is made of a reinforcing filler comprising between 50 and 120 phr of inorganic filler, particularly silica, and optionally carbon black; the carbon black, when it is present, is preferably used at a content of less than 20 phr, more preferably of less than 10 phr (for example between 0.1 and 10 phr).

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "asymmetrical" depending on their particular structure, as described, for example, in Applications WO 03/002648 (or US 2005/016651) and WO 03/002649 (or US 2005/016650).

Particularly suitable, without the definition below being limiting, are "symmetrical" silane polysulphides corresponding to the following general formula (I):

$$Z-A-S_x-A-Z, \qquad (I)$$

in which:
x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, especially $C_1$-$C_4$, alkylenes, in particular propylene);
Z corresponds to one of the formulae below:

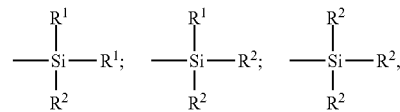

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (I), in particular the standard commercially available mixtures, the mean value of the "x" index is a fractional number preferably between 2 and 5, more preferably in the vicinity of 4. However, the invention may also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono ($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl) tetrasulphide, as described in Patent Application WO 02/083782 (or US 2004/132880).

Mention will in particular be made, as a coupling agent other than an alkoxysilane polysulphide, of bifunctional POSs (polyorganosiloxanes) or else of hydroxysilane polysulphides ($R^2$=OH in the above formula I), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions of the tyres in accordance with the invention, the content of coupling agent is preferably between 4 and 12 phr, more preferably between 4 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II.4—Various Additives

The rubber compositions of the tyre treads in accordance with the invention also comprise all or some of the usual additives customarily used in the elastomer compositions intended for the manufacture of treads, such as, for example, pigments, protective agents, such as antiozone waxes, chemical antiozonants, antioxidants, plasticizing agents other than those mentioned above, antifatigue agents, reinforcing resins, methylene acceptors (for example, phenol-novolac resin) or methylene donors (for example, HMT or H3M), a crosslinking system based either on sulphur or on sulphur donors and/or on peroxide and/or on bismaleimides, vulcanization accelerators and vulcanization activators.

These compositions may also comprise, in addition to coupling agents, coupling activators, agents for covering the inorganic fillers or more generally processing aids capable, in a known manner, by virtue of an improvement in the dispersion of the filler in the rubber matrix and of a lowering in the viscosity of the compositions, of improving their ability to be processed in the uncured state, these agents being, for example, hydrolysable silanes, such as alkylalkoxysilanes, polyols, polyethers, primary, secondary or tertiary amines or hydroxylated or hydrolysable polyorganosiloxanes.

According to one preferred embodiment, the tyre treads according to the invention also comprise rubber compositions that comprise a plasticizing agent. Preferably, this plasticizing agent is a solid hydrocarbon-based resin, a liquid plasticizer or a mixture of the two.

The content of plasticizing agent is preferably between 5 and 50 phr, more preferably between 10 and 40 phr, for example between 15 and 35 phr.

According to a first preferred embodiment of the invention, this plasticizing agent is a hydrocarbon-based resin, the $T_g$ of which is above 0° C., preferably above +20° C.

In a manner known to a person skilled in the art, the name "resin" is reserved in the present patent application, by definition, for a compound which is solid at ambient temperature (23° C.) (in contrast to a liquid plasticizing compound, such as an oil).

Preferably, the hydrocarbon-based plasticizing resin exhibits at least any one of the following characteristics:

a $T_g$ of above 20° C., more preferably of above 30° C.;
a number-average molecular weight ($M_n$) of between 400 and 2000 g/mol, more preferably of between 500 and 1500 g/mol;
a polydispersity index ($I_p$) of less than 3, more preferably of less than 2 (reminder: $I_p=M_w/M_n$ with $M_w$ the weight-average molecular weight).

More preferably, this hydrocarbon-based plasticizing resin exhibits all of the preferred characteristics above.

The macrostructure ($M_w$, $M_n$ and $I_p$) of the hydrocarbon-based resin is determined by size exclusion chromatography (SEC): tetrahydrofuran solvent; 35° C. temperature; 1 g/l concentration; 1 ml/min flow rate; solution filtered through a filter with a porosity of 0.45 μm before injection; Moore calibration with polystyrene standards; set of 3 WATERS columns in series (STYRAGEL HR4E, HR1 and HR0.5); detection by differential refractometer (WATERS 2410) and its associated operating software (WATERS EMPOWER).

The hydrocarbon-based resins may be aliphatic or aromatic or else of aliphatic/aromatic type, that is to say based on aliphatic and/or aromatic monomers. They may be natural or synthetic and may or may not be petroleum-based (if such is the case, also known under the name of petroleum resins).

According to one particularly preferred embodiment, the hydrocarbon-based plasticizing resin is chosen from the group formed by cyclopentadiene (abbreviated to CPD) or dicyclopentadiene (abbreviated to DCPD) homopolymer or copolymer resins, terpene homopolymer or copolymer resins, terpene-phenol homopolymer or copolymer resins, $C_5$-cut homopolymer or copolymer resins, $C_9$-cut homopolymer or copolymer resins and blends of these resins.

The term "terpene" includes here, as is known, α-pinene, β-pinene and limonene monomers. It is preferable to use a limonene monomer, a compound which, as is known, can take the form of three possible isomers: L-limonene (laevogyratory enantiomer), D-limonene (dextrogyratory enantiomer), or else dipentene (the racemic mixture of the dextrogyratory and laevogyratory enantiomers).

Mention will especially be made, among the above hydrocarbon-based plasticizing resins, of α-pinene, β-pinene, dipentene or polylimonene homopolymer or copolymer resins, $C_5$-cut homopolymer or copolymer resins, $C_9$-cut homopolymer or copolymer resins and blends of these resins, which can be used alone or in combination with a liquid plasticizer, for example an oil such as MES or TDAE.

Suitable aromatic monomers are for example: styrene, α-methylstyrene, ortho-, meta- and para-methylstyrene, vinyltoluene, para-tert-butylstyrene, methoxystyrenes, chlorostyrenes, vinylmesitylene, divinylbenzene, vinylnaphthalene and any vinylaromatic monomer derived from a $C_9$-cut (or more generally a $C_8$- to $C_{10}$-cut). Preferably, the vinylaromatic monomer is styrene or a vinylaromatic monomer derived from a $C_9$-cut (or more generally a $C_8$- to $C_{10}$-cut). Preferably, the vinylaromatic monomer is the minority monomer, expressed as a mole fraction, in the copolymer in question.

By way of example of preferred resins, mention may especially be made of phenol-modified α-methylstyrene resins. In order to characterize these phenol-modified resins, it is recalled that use is made, in a known manner, of a value known as the "hydroxyl value" (measured according to standard ISO 4326 and expressed as mg KOH/g).

The α-methylstyrene resins, in particular the phenol-modified α-methylstyrene resins, described above are well known to a person skilled in the art and are commercially available, for example sold by Arizona Chemical under the names Sylvares SA 100 ($M_n$=660 g/mol; $I_p$=1.5; $T_g$=53° C.); Sylvares SA 120 ($M_n$=1030 g/mol; $I_p$=1.9; $T_g$=64° C.); Sylvares 540 ($M_n$=620 g/mol; $I_p$=1.3; $T_g$=36° C.; hydroxyl value=56 mg KOH/g); Sylvares 600 ($M_n$=850 g/mol; $I_p$=1.4; $T_g$=50° C.; hydroxyl value=31 mg KOH/g).

All the above resins are well known to those skilled in the art and are commercially available, for example:

- those sold by DRT under the name Dercolyte L120 ($M_n$=625 g/mol; $M_w$=1010 g/mol; $I_p$=1.6; $T_g$=72° C.) or by Arizona under the name Sylvagum TR7125C ($M_n$=630 g/mol; $M_w$=950 g/mol; $I_p$=1.5; $T_g$=70° C.), as regards polylimonene resins;
- those sold by Neville Chemical Company under the names Super Nevtac 78, Super Nevtac 85 or Super Nevtac 99, sold by Goodyear Chemicals under the name Wingtack Extra, sold by Kolon under the names Hikorez T1095 and Hikorez T1100 or sold by Exxon under the names Escorez 2101 and ECR 373, as regards $C_5$-cut/vinylaromatic copolymer resins, especially $C_5$-cut/styrene or $C_5$-cut/$C_9$-cut copolymer resins;
- those sold by DRT under the name Dercolyte TS 105 or by Arizona Chemical Company under the names ZT115LT and ZT5100, as regards limonene/styrene copolymer resins.

According to another preferred embodiment of the invention, the plasticizer is a plasticizer that is liquid at 20° C., referred to as a "low $T_g$ plasticizer", i.e. which has, by definition, a $T_g$ of below −20° C., preferably of below −40° C.

Any extender oil, whether of aromatic or non-aromatic nature, any liquid plasticizing agent known for its plasticizing properties with regard to diene elastomers, can be used. Liquid plasticizers chosen from the group formed by naphthenic oils, particularly hydrogenated naphthenic oils, paraffinic oils, MES oils, TDAE oils, ester and ether plasticizers, phosphate and sulphonate plasticizers and the mixtures of these compounds are particularly suitable.

The compounds chosen from the group formed by phosphates, trimellitates, pyromellitates, phthalates, 1,2-cyclohexane dicarboxylates, adipates, azelates, sebacates, glycerol triesters, and mixtures of these compounds are particularly preferred.

II.5—Preparation of the Rubber Compositions

The compositions used in the tyre treads of the invention may be manufactured in appropriate mixers using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically below 110° C., for example between 40° C. and 100° C., finishing phase during which the crosslinking system is incorporated.

The process for preparing such compositions comprises, for example, the following stages:

- incorporating into a polybutadiene, during a first stage (referred to as a "non-productive" stage), at least one saturated TPS elastomer and a reinforcing filler, everything being kneaded thermomechanically (for example in one or more steps), until a maximum temperature of between 110° C. and 190° C. is reached;
- cooling the combined mixture to a temperature below 100° C.;
- subsequently incorporating, during a second stage (referred to as a "productive" stage), a crosslinking system; kneading everything up to a maximum temperature below 110° C.

By way of example, the non-productive phase is carried out in a single thermomechanical stage during which, in a first step, all the necessary base constituents (from 10 to 60 phr of polybutadiene, from 1 to 60 phr of saturated thermoplastic styrene copolymer, the reinforcing filler) are introduced into an appropriate mixer, such as a standard internal mixer, followed, in a second step, for example after kneading for one to two minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated in an external mixer, such as an open mill, maintained at a low temperature (for example, between 40° C. and 100° C.). The combined mixture is then mixed (productive phase) for a few minutes, for example between 2 and 15 min.

The crosslinking system itself is preferably based on sulphur and on a primary vulcanization accelerator, in particular an accelerator of the sulphenamide type. Added to this vulcanization system, are various known secondary accelerators or vulcanization activators, such as zinc oxide, stearic acid, guanidine derivatives (in particular diphenylguanidine), etc., incorporated during the first non-productive phase and/or during the productive phase. The sulphur content is preferably between 0.5 and 3.0 phr and the primary accelerator content is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are more preferably chosen from the group formed by 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI"), zinc dibenzyldithiocarbamate (abbreviated to "ZBEC") and mixtures of these compounds. Preferably, a primary accelerator of the sulphenamide type is used.

The final composition thus obtained may then be calendered, for example in the form of a sheet or a slab, in particular for laboratory characterization, or else is extruded, for example to form a rubber profiled element used for manufacturing a tread.

The invention relates to the tyres described above, both in the uncured state (i.e., before curing) and in the cured state (i.e., after crosslinking or vulcanization).

III—Exemplary Embodiments of the Invention

III.1—Preparation of the Compositions

The tests which follow are carried out in the following manner: from 10 to 60 phr of polybutadiene, from 10 to 60 phr of saturated TPS, the reinforcing filler (silica and carbon black), and also the various other ingredients, with the exception of the vulcanization system, are successively introduced into an internal mixer (final fill ratio: around 70% by volume), the initial vessel temperature of which is around 60° C. Thermomechanical working (non-productive phase) is then carried out in one stage, which lasts in total approximately 3 to 4 min, until a maximum "dropping" temperature of 165° C. is reached.

The mixture thus obtained is recovered and cooled and then sulphur and an accelerator of sulphenamide type are incorporated in a mixer (homofinisher) at 30° C., the combined mixture being mixed (productive phase) for an appropriate time (for example, between 5 and 12 min).

The compositions thus obtained are subsequently calendered, either in the form of slabs (thickness of 2 to 3 mm) or of fine sheets of rubber, for the measurement of their physical or mechanical properties, or extruded in the form of a tread.

III.2—Tests

These tests demonstrate the improvement in the stiffness of the compositions of tyre treads according to the invention, in comparison with a tread from the control test.

In order to do this, eight rubber compositions were prepared as indicated previously, six in accordance with the invention (denoted hereinbelow by C.2, C.3, C.4, C.6, C.7 and C.8) and two not in accordance with the invention (controls, denoted hereinbelow by C.1 and C.5).

Their formulations (in phr) and the results of the tests have been summarized in the appended Tables 1, 2 and 3.

Compositions C.1 and C.5 are two reference compositions for a person skilled in the art, based on SBR and BR, which are conventionally used for manufacturing treads of "green tyres" for passenger vehicles.

Compositions C.2, C.3 and C.4 of tyre treads according to the invention are based on BR and on a saturated TPS, respectively SEPS, SEEPS and SEBS. Compositions C.6, C.7 and C.8 of tyre treads according to the invention are based on BR, SBR and on a saturated TPS, respectively SEPS, SEEPS and SEBS. Compositions C.1 to C.8 all comprise a plasticizing agent comprising a hydrocarbon-based resin (a polylimonene resin) and a liquid plasticizer (MES oil).

Firstly, it is noted that compositions C.2, C.3 and C.4 on the one hand and C.6, C.7 and C.8 on the other hand of tyre treads according to the invention have Shore A hardness values and values of MA10 and MA100 that are all increased relative to the control compositions C.1 and C.5. This increase in stiffness is, for a person skilled in the art, a recognized indicator of an improvement in the handling performance of vehicles fitted with tyres in accordance with the invention.

Secondly, it is noted that the compositions of tyre treads according to the invention have a value of $\tan(\delta)_{40°\,C}$ which is substantially equal to that of the control compositions C.1 and C.5 respectively, which is synonymous with an equivalent hysteresis and therefore with an equivalent rolling resistance.

In conclusion, the results of these tests demonstrate that the combined use of a polybutadiene and a saturated TPS copolymer in the required proportions makes it possible to significantly improve the stiffness of the compositions and therefore the handling performance of tyre treads according to the invention, while retaining a low hysteresis and therefore a rolling resistance which are not degraded relative to those of conventional "green tyres".

TABLE 1

| Composition No. | C. 1 | C. 2 | C. 3 | C. 4 |
|---|---|---|---|---|
| BR (1) | 50 | 50 | 50 | 50 |
| SBR (2) | 50 | — | — | — |
| TPS elastomer (3) | — | 50 | — | — |
| TPS elastomer (4) | — | — | 50 | — |
| TPS elastomer (5) | — | — | — | 50 |
| Silica (6) | 90 | 90 | 90 | 90 |
| Coupling agent (7) | 7.2 | 7.2 | 7.2 | 7.2 |
| Carbon black (8) | 4 | 4 | 4 | 4 |
| Plasticizer (9) | 19 | 19 | 19 | 19 |
| Plasticizer (10) | 20 | 20 | 20 | 20 |
| Stearic acid (11) | 3 | 3 | 3 | 3 |
| ZnO (12) | 2 | 2 | 2 | 2 |
| Sulphur (13) | 1.4 | 1.4 | 1.4 | 1.4 |
| CBS (14) | 1.6 | 1.6 | 1.6 | 1.6 |
| DPG (15) | 2.1 | 2.1 | 2.1 | 2.1 |
| Antioxidant (16) | 1.5 | 1.5 | 1.5 | 1.5 |
| Antiozonant (17) | 2.2 | 2.2 | 2.2 | 2.2 |

(1) BR with 4.3% of 1,2- units; 2.7% of trans- units; 93% of cis-1,4- units($T_g = -106°$ C.);
(2) SBR solution (content expressed as dry SBR); 25% of styrene, 58% of 1,2-polybutadiene units and 22% of trans-1,4-polybutadiene units ($T_g = -21°$ C.);
(3) SEPS TPS ("Septon 2007" from Kuraray);
(4) SEEPS TPS ("Septon 4033" from Kuraray);
(5) SEBS TPS ("Septon 8004" from Kuraray);
(6) Silica: "Zeosil 1165 MP" from Rhodia, of "HD" type - (BET and CTAB: around 160 m²/g);
(7) TESTP coupling agent ("Si69" from Degussa);
(8) Carbon black: N234 (ASTM grade);
(9) MES oil ("Catenex SNR" from Shell)
(10) Polylimonene resin ("Dercolyte L120 from DRT);
(11) Stearine ("Pristerene" from Uniquema);
(12) Zinc oxide (industrial grade - from Umicore);
(13) Sulphur;
(14) N-cyclohexyl-2-benzothiazyl sulphenamide (Santocure CBS from Flexsys);
(15) DPG = Diphenylguanidine ("Perkacit DPG" from Flexsys);
(16) N-1,3-dimethylbutyl-N-phenyl-para-phenylenediamine (Santoflex 6-PPD from Flexsys);
(17) Antiozone wax.

TABLE 2

| Composition No. | C. 5 | C. 6 | C. 7 | C. 8 |
|---|---|---|---|---|
| BR (1) | 30 | 30 | 30 | 30 |
| SBR (2) | 70 | 50 | 50 | 50 |
| TPS elastomer (3) | — | 20 | — | — |
| TPS elastomer (4) | — | — | 20 | — |
| TPS elastomer (5) | — | — | — | 20 |
| Silica (6) | 82 | 82 | 82 | 82 |
| Coupling agent (7) | 6.6 | 6.6 | 6.6 | 6.6 |
| Carbon black (8) | 4 | 4 | 4 | 4 |
| Plasticizer (9) | 20 | 20 | 20 | 20 |
| Plasticizer (10) | 12 | 12 | 12 | 12 |
| Stearic acid (11) | 2 | 2 | 2 | 2 |
| ZnO (12) | 1.5 | 1.5 | 1.5 | 1.5 |
| Sulphur (13) | 1.2 | 1.2 | 1.2 | 1.2 |
| CBS (14) | 1.9 | 1.9 | 1.9 | 1.9 |
| DPG (15) | 1.5 | 1.5 | 1.5 | 1.5 |
| Antioxidant (16) | 1.5 | 1.5 | 1.5 | 1.5 |
| Antiozonant (17) | 1.9 | 1.9 | 1.9 | 1.9 |

(1) BR with 4.3% of 1,2- units; 2.7% of trans- units; 93% of cis-1,4- units($T_g = -106°$ C.);
(2) SBR solution (content expressed as dry SBR); 25% of styrene, 58% of 1,2-polybutadiene units and 22% of trans-1,4-polybutadiene units ($T_g = -21°$ C.);
(3) SEPS TPS ("Septon 2007" from Kuraray);
(4) SEEPS TPS ("Septon 4033" from Kuraray);
(5) SEBS TPS ("Septon 8004" from Kuraray);
(6) Silica: "Zeosil 1165 MP" from Rhodia, of "HD" type - (BET and CTAB: around 160 m²/g);
(7) TESTP coupling agent ("Si69" from Degussa);
(8) Carbon black: N234 (ASTM grade);
(9) MES oil ("Catenex SNR" from Shell)
(10) Polylimonene resin ("Dercolyte L120 from DRT);
(11) Stearine ("Pristerene" from Uniquema);
(12) Zinc oxide (industrial grade - from Umicore);
(13) Sulphur;
(14) N-cyclohexyl-2-benzothiazyl sulphenamide (Santocure CBS from Flexsys);
(15) DPG = Diphenylguanidine ("Perkacit DPG" from Flexsys);
(16) N-1,3-dimethylbutyl-N-phenyl-para-phenylenediamine (Santoflex 6-PPD from Flexsys);
(17) Antiozone wax.

TABLE 3

| | Composition No. | | | | | | | |
|---|---|---|---|---|---|---|---|---|
| | C.1 | C.2 | C.3 | C.4 | C.5 | C.6 | C.7 | C.8 |
| Shore A | 65 | 78 | 80 | 80 | 68 | 72 | 74 | 73 |
| MA10 | 5 | 11 | 12 | 12 | 2.3 | 8 | 8.4 | 8 |
| MA100 | 1.8 | 3 | 3.3 | 3.2 | 2.3 | 2.8 | 3 | 3 |
| $T_g(\delta)_{40°C.}$ | 0.21 | 0.21 | 0.21 | 0.23 | 0.23 | 0.22 | 0.22 | 0.22 |

The invention claimed is:

1. Tire, the tread of which comprises an elastomer composition comprising:
   from 10 to 60 phr of a polybutadiene (BR) elastomer;
   from 15 to 60 phr of a saturated thermoplastic styrene (TPS) elastomer; and
   a reinforcing filler;
   wherein phr stands for parts by weight per hundred parts of total elastomer, including said saturated TPS elastomer.

2. Tire according to claim 1, wherein the BR content is between 20 and 55 phr.

3. Tire according to claim 1, wherein the content of saturated TPS elastomer is between 15 and 55 phr.

4. Tire according to claim 1, wherein the saturated TPS elastomer comprises styrene blocks and alkylene blocks.

5. Tire according to claim 4, wherein the alkylene blocks are ethylene, propylene or butylene blocks.

6. Tire according to claim 5, wherein the saturated TPS elastomer is chosen from the group consisting of styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS), styrene/ethylene/ethylene/propylene/styrene (SEEPS) block copolymers and blends of these copolymers.

7. Tire according to claim 6, wherein the saturated TPS elastomer is chosen from the group consisting of styrene/ethylene/butylene (SEBS), styrene/ethylene/ethylene/propylene/styrene (SEEPS), styrene/ethylene/propylene/styrene (SEPS) block copolymers and blends of these copolymers.

8. Tire according to claim 1, wherein the elastomer composition further comprises a second diene elastomer chosen from the group consisting of styrene-butadiene copolymers (SBRs), natural rubber (NR), synthetic polyisoprenes (IRs), isoprene-styrene copolymers (SIRs), isoprene-butadiene copolymers (BIRs), styrene-butadiene-isoprene terpolymers (SBIRs) and blends of these elastomers.

9. Tire according to claim 8, wherein the content of the second diene elastomer is between 0 and 80 phr.

10. Tire according to claim 9, wherein the content of the second diene elastomer is in the range from 5 to 60 phr.

11. Tire according to claim 1, wherein the rubber composition also comprises a plasticizing agent.

12. Tire according to claim 11, wherein the content of plasticizing agent is between 5 and 50 phr.

13. Tire according to claim 11, wherein the plasticizing agent is a hydrocarbon-based resin, having a glass transition temperature ($T_g$) which is above 0 °C.

14. Tire according to claim 13, wherein the hydrocarbon-based resin is chosen from the group consisting of cyclopentadiene (abbreviated to CPD) or dicyclopentadiene (abbreviated to DCPD) homopolymer or copolymer resins, terpene homopolymer or copolymer resins, terpene-phenol homopolymer or copolymer resins, $C_5$-cut homopolymer or copolymer resins, $C_9$-cut homopolymer or copolymer resins and blends of these resins.

15. Tire according to claim 11, wherein the plasticizing agent is liquid at 20° C. and has a glass transition temperature ($T_g$) below −20° C.

16. Tire according to claim 15, wherein the liquid plasticizing agent is chosen from the group consisting of naphthenic oils, paraffinic oils, MES oils, TDAE oils, ester plasticizers, ether plasticizers, phosphate plasticizers, sulphonate plasticizers and mixtures of these compounds.

17. Tire according to claim 11, wherein the plasticizing agent comprises a hydrocarbon-based resin having a glass transition temperature ($T_g$) which is above 0° C. and a liquid plasticizer which is liquid at 20° C. and has a glass transition temperature ($T_g$) below −20° C.

18. Tire according to claim 1, wherein the rubber composition comprises a reinforcing filler comprising carbon black, silica or a mixture of carbon black and silica.

* * * * *